(12) United States Patent
Kim et al.

(10) Patent No.: US 7,788,728 B2
(45) Date of Patent: Aug. 31, 2010

(54) METHOD AND APPARATUS FOR LIMITING NUMBER OF TIMES CONTENTS CAN BE ACCESSED USING HASH CHAIN

(75) Inventors: Myung-sun Kim, Uiwang-si (KR); Su-hyun Nam, Seoul (KR); Yong-jin Jang, Uiwang-si (KR); Sun-nam Lee, Suwon-si (KR); Jae-heung Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1329 days.

(21) Appl. No.: 11/030,560

(22) Filed: Jan. 7, 2005

(65) Prior Publication Data

US 2005/0256910 A1  Nov. 17, 2005

(30) Foreign Application Priority Data

Jan. 8, 2004  (KR) .................... 10-2004-0001095

(51) Int. Cl.
  *G06F 21/24*  (2006.01)
  *H04L 9/08*  (2006.01)
(52) U.S. Cl. .................... 726/30; 380/259; 380/260; 380/278; 380/44
(58) Field of Classification Search ............... None
  See application file for complete search history.

(56) References Cited

U.S. PATENT DOCUMENTS

| 5,796,839 | A | * | 8/1998 | Ishiguro ............... | 380/44 |
|---|---|---|---|---|---|
| 6,119,229 | A | | 9/2000 | Martinez et al. | |
| 6,363,149 | B1 | * | 3/2002 | Candelore ............. | 380/45 |
| 6,425,280 | B1 | | 7/2002 | Ames et al. | |
| 2001/0034839 | A1 | | 10/2001 | Karjoth et al. | |
| 2001/0049665 | A1 | * | 12/2001 | Kuroiwa ............... | 705/52 |
| 2002/0114465 | A1 | | 8/2002 | Shen-Orr et al. | |

FOREIGN PATENT DOCUMENTS

| JP | 11-024916 A | 1/1999 |
|---|---|---|
| KR | 2000-29105 A | 5/2000 |
| KR | 2001-0014639 A | 2/2001 |
| KR | 2001-0014982 A | 2/2001 |
| KR | 2001-0034448 A | 4/2001 |
| KR | 2001-0086038 A | 9/2001 |
| KR | 2002-0003375 A | 1/2002 |
| KR | 10-2002-0037308 A | 5/2002 |

(Continued)

*Primary Examiner*—Minh Dinh
(74) *Attorney, Agent, or Firm*—Sughrue Mion, PLLC (57) ABSTRACT

A method and apparatus are provided for simply and securely limiting a number of times that contents can be accessed using a hash chain. The apparatus limiting a number of times contents are accessed by a user terminal includes a hash chain generator receiving information indicating selected contents by the user terminal and information indicating how many times (n) the user terminal has authority to access the selected contents and generating a hash chain including n hash values derived from a seed value, and a contents access manager deleting the hash values one by one from the hash chain whenever the user terminal accesses the selected contents such that the number of times the contents can be accessed by the user terminal is decreased by the number of deleted hash values.

14 Claims, 5 Drawing Sheets

FOREIGN PATENT DOCUMENTS

| | | |
|---|---|---|
| KR | 2002-0037308 A | 5/2002 |
| KR | 2002-0064672 A | 8/2002 |
| KR | 10-2002-0090106 A | 11/2002 |
| KR | 10-2003-0016151 A | 2/2003 |
| KR | 2003-0016151 A | 2/2003 |
| KR | 2003-0066433 A | 8/2003 |
| WO | WO 00-04458 A | 1/2000 |
| WO | WO 02-19598 A | 3/2002 |
| WO | WO 02-086725 A | 10/2002 |

* cited by examiner

USER INFORMATION DB

| USER ID : SAMSUNG | |
|---|---|
| CONTENTS PURCHASE HISTORY | $\beta_1$ |
| | $\beta_2$ |
| | $\beta_3$ |
| | ⋮ |

FIG. 4

HASH CHAIN DB

| USER ID : SAMSUNG | | |
|---|---|---|
| $\beta_1$ | $W_4$ | ← $H(S_1)$ |
| | $W_3$ | ← $H(W_4)$ |
| | $W_2$ | ← $H(W_3)$ |
| | $W_1$ | ← $H(W_2)$ |
| | $W_0$ | ← $H(W_1)$ |
| $\beta_2$ | $W_1$ | ← $H(S_2)$ |
| | $W_0$ | ← $H(W_1)$ |
| $\beta_3$ | $W_0$ | ← $H(S_3)$ |
| ⋮ | ⋮ | |

METHOD AND APPARATUS FOR LIMITING NUMBER OF TIMES CONTENTS CAN BE ACCESSED USING HASH CHAIN

BACKGROUND OF THE INVENTION

This application claims priority from Korean Patent Application No. 2004-1095, filed on Jan. 8, 2004 in the Korean Intellectual Property Office, the disclosure of which is incorporated herein in its entirety by reference.

FIELD OF THE INVENTION

The present invention relates to technology of limiting a number of times digital contents disseminated over a network can be accessed, and more particularly, to a method and apparatus for limiting the number of times that the digital contents can be accessed using a hash chain, and a computer readable recording medium on which a program executing the method is recorded.

DESCRIPTION OF THE RELATED ART

Unlike analog contents, digital contents disseminated over networks such as the Internet may be copied and reproduced an unlimited number of times without any degradation or loss of information. Therefore, a particular system protecting copyrights on the digital contents is required.

A variety of techniques for protecting copyrights on the digital contents have been suggested. For example, Korean Patent No. 2002-18427, entitled "System for automatically erasing digital contents," provides a system erasing digital contents gradually by a predetermined amount whenever the digital contents are reproduced and, after a predetermined number of reproductions, reproducing the digital contents in a state that a user cannot perceive.

Korean Patent No. 2002-5614, entitled "Method and system for safely distributing computer software products," provides a system distributing a software program over a network or using a portable storage medium such as a DVD or a CD-ROM and not allowing a user to access the software program after the software program has be reproduced a set number of times or after a set period of time has passed.

In addition, Korean Patent No. 2001-88881, entitled "Method of protecting copyrights on contents," provides a method in which digital contents requested by a mobile communications terminal and information regarding a limited number of times that the digital contents can be reproduced are transmitted. Once this is received, the mobile communications terminal can reproduce the digital contents only up to the limited number of times In Korean Patent No. 2002-18427, the audio and visual quality of the digital contents deteriorate whenever reproduced. Korean Patent No. 2002-5614 uses a public key infrastructure (PKI) notorious for its inefficient operation. In Korean Patent No. 2001-88881, since a user manages the information regarding the limited number of times that the digital contents can be reproduced, the information can be modified or illegally disseminated.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a method and apparatus for simply and securely limiting a number of times that digital contents can be accessed using a hash chain.

The present invention further provides a method and apparatus for limiting the number of times that the digital contents can be accessed in which a digital contents supplier manages information regarding a limited number of times that the digital contents can be accessed, thereby effectively managing copyrights on the digital contents.

According to an aspect of the present invention, there is provided an apparatus limiting a number of times contents are accessed by a user terminal. The apparatus includes a hash chain generator receiving information indicating selected contents by the user terminal and information indicating how many times (n) the user terminal has authority to access the selected contents and generating a hash chain comprising n hash values derived from a seed value; and a contents access manager deleting the hash values one by one from the hash chain whenever the user terminal accesses the selected contents such that the number of times the contents can be accessed by the user terminal is decreased by the number of deleted hash values.

The hash chain generator may generate the seed value randomly and transmit the generated seed value to the user terminal such that the user terminal can also generate a hash chain identical to the hash chain generated by the hash chain generator based on the seed value. The seed value may be received from the user terminal.

The contents access manager may encrypt the contents using one of the hash values of the hash chain and transmit encrypted contents to the user terminal, thereby allowing the user terminal to access the contents. The hash value used for encryption may be deleted from the hash chain. The contents access manager may encrypt the selected contents using a hash value corresponding to a total number of times that the contents have been accessed, transmit the encrypted contents to the user terminal when the hash value corresponding to the total number of times that the selected contents have been accessed is received from the user terminal, and point a pointer of the hash chain to a hash value corresponding to a next number of times the selected contents have been accessed.

According to another aspect of the present invention, there is provided a method of limiting a number of times contents are accessed. The method includes receiving information indicating selected contents by a user terminal and information indicating how many times (n) the user terminal has authority to access the selected contents, and generating a hash chain comprising n hash values derived from a seed value.

The seed value may be received from a terminal requesting access to the contents. The seed value may be generated by a server allowing access to the contents.

According to another aspect of the present invention, there is provided a method of limiting a number of times contents are accessed by a contents requester having authority to access the contents n times. The method includes preparing a hash chain with respect to the contents, the hash chain comprising n hash values derived from a seed value; and deleting a hash value from the hash chain whenever the contents requester accesses the contents such that the total number of hash values deleted equals the number of times that the contents have been accessed by the contents requester.

The deleting the hash value from the hash chain whenever the contents requester accesses the contents may include encrypting the contents using one of the hash values of the hash chain and transmitting encrypted contents to the contents requester, thereby allowing the contents requester to access the contents. The hash value used for encryption may be deleted from the hash chain. In addition, the encrypting the contents using one of the hash values of the hash chain and transmitting the encrypted contents to the contents requester may include encrypting the contents using a hash value corresponding to a total number of times that the contents have been accessed and transmitting the encrypted contents to the contents requester when receiving the hash value corresponding to the total number of times that the contents have been accessed from the contents requester; and pointing a pointer of the hash chain to a hash value corresponding to a next number of times that the contents have been accessed.

According to another aspect of the present invention, there is provided a computer readable recording medium on which a program executing a method of limiting a number of times contents are accessed by a contents requester having authority to access the contents n times has been recorded.

According to another aspect of the present invention, there is provided an apparatus having authority to access contents n times. The apparatus includes a hash chain generator generating a hash chain comprising n hash values derived from a seed value; a hash chain manager transmitting to a contents supplier a hash value corresponding to a total number of times that the contents have been accessed; and a contents decrypter decrypting encrypted contents received from the contents supplier using the hash value corresponding to the total number of times that the contents have been accessed.

The hash chain manager may delete the hash value corresponding to the total number of times that the contents have been used from the hash chain. The seed value may be received from the contents supplier.

According to another aspect of the present invention, there is provided a computer readable recording medium on which a program executing a method of limiting a number of times contents are accessed by a contents requester having authority to access the contents n times is recorded. The method includes generating a hash chain comprising n hash values derived from a seed value; transmitting to the contents supplying server a hash value corresponding to a total number of times that the contents have been accessed; receiving encrypted contents using the hash value corresponding to the accumulated number of access to the contents from the contents supplying server; and decrypting the encrypted contents encrypted using the hash value corresponding to the total number of times that the contents have been accessed.

The generating the hash chain including n hash values derived from a seed value may further include generating the seed value randomly and transmitting the generated seed value to the contents supplying server such that the contents supplying server can also generate a hash chain identical to the hash chain generated by the hash chain generator based on the seed value. The seed value may be received from the contents supplying server.

The method may further include deleting the hash value corresponding to the total number of times that the contents have been accessed from the hash chain after completing the decrypting the encrypted contents; and pointing a pointer of the hash chain to a hash value corresponding to a next number of times that the contents have been accessed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments to convey the concept of the invention to those skilled in the art.

Figure 1:
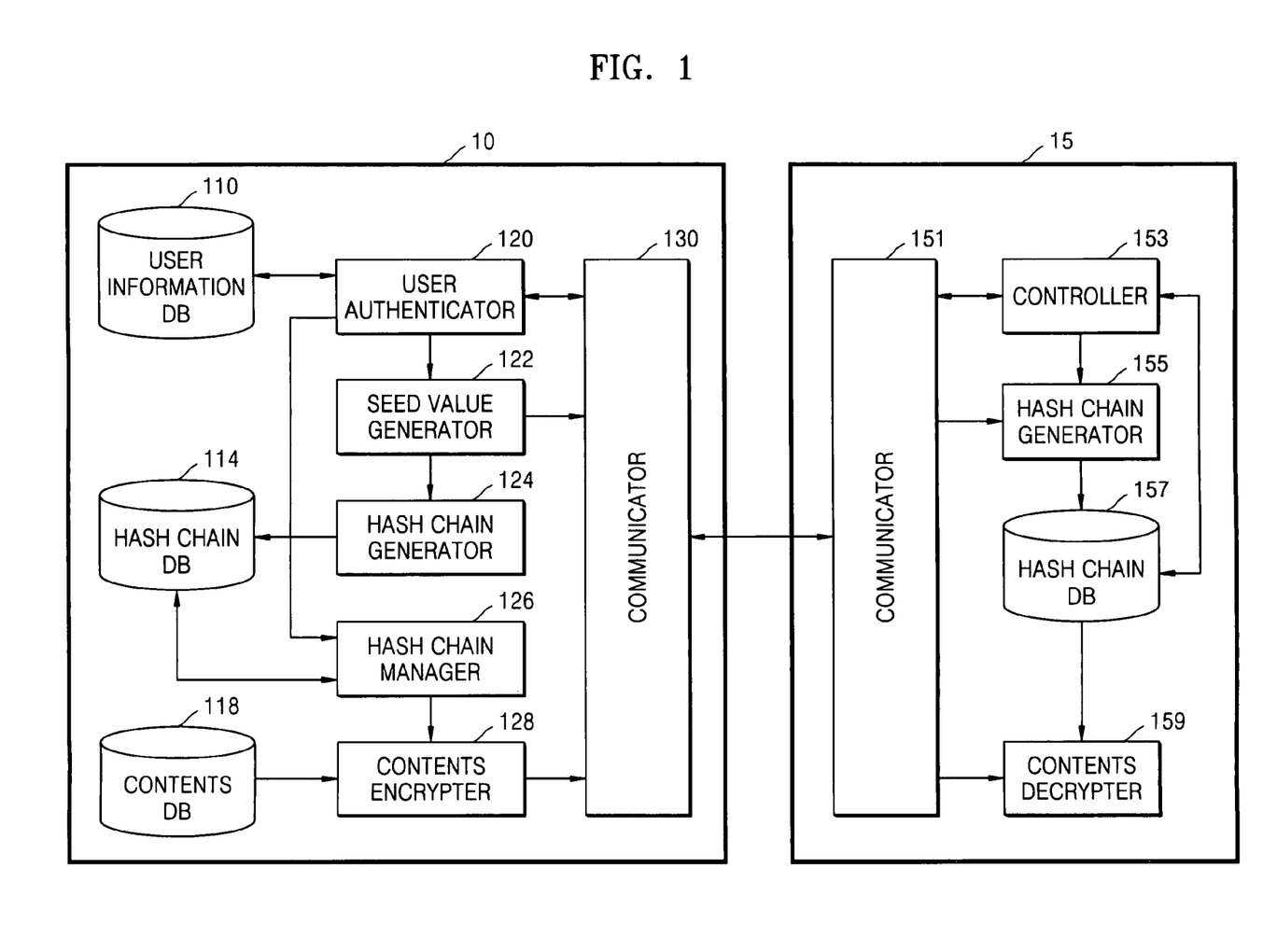
FIG. 1 is a block diagram of a system limiting a number of times that digital contents can be accessed according to an exemplary embodiment of the present invention.

FIG. 1 is a block diagram of a system limiting a number of times that digital contents can be accessed according to an exemplary embodiment of the present invention. The system includes a contents supplying server 10 and a user terminal 15 accessing the contents supplying server 10 through a wireless or wired communications network.

The contents supplying server 10 includes a user information database (DB) 110, a hash chain DB 114, a contents DB 118, a user authenticator 120, a seed value generator 122, a has chain generator 124, a hash chain manager 126, a contents encrypter 128, and a communicator 130. The user information DB 110 stores user IDs registered in the contents supplying server 10. The hash chain DB 114 stores a plurality of hash values to be used as encryption keys for encrypting contents to be transmitted to the user terminal 15. The contents DB 118 stores contents to be transmitted to the user terminal 15. The user authenticator 120 authenticates the user terminal 15 requesting the contents. The seed value generator 122 generates and outputs seed values required for generating a hash chain. The hash chain generator 124 generates a hash chain composed of a plurality of hash values derived from the seed values generated by the seed value generator 122. The hash chain manager 126 manages the hash chain DB 114 by determining whether a user is authorized to access contents, outputting a hash value to be used as an encryption key for encrypting the contents, and deleting the hash value used as an encryption key from the hash chain. The contents encrypter 128 encrypts the contents requested by the user using the hash value output from the hash chain manager 126. The communicator 130 exchanges data with the user terminal 15.

The contents supplying server 10 receives a request for purchasing contents from the user terminal 15, provides a web page for supplying the contents to the user terminal 15, and manages billing for the supply of the contents.

The user terminal 15 includes a communicator 151, a hash chain generator 155, a hash chain DB 157, a contents decrypter 159, and a controller 153. The communicator 151 exchanges data with the contents supplying server 10. The hash chain generator 155 generates a hash chain including a plurality of hash values based on the seed value received from the contents supplying server 10. The hash chain DB 157 stores the generated hash chain. The contents decrypter 159 receives the contents encrypted using a predetermined hash value from the contents supplying server 10 and decrypts the encrypted contents using a predetermined hash value stored in the hash chain DB 157. The controller 153 controls the overall operation of the user terminal 15.

The user information DB 110, the hash chain DB 114, and the contents DB 118 may be recording mediums such as hard discs. The user authenticator 120, the seed value generator 122, the hash chain generator 124, the hash chain manager 126, the contents encrypter 128, and the communicator 130 may each be embodied via a central processing unit (CPU), a memory device such as a random access memory (RAM) or a read only memory (ROM), and a program executed by the CPU.

Figure 2:
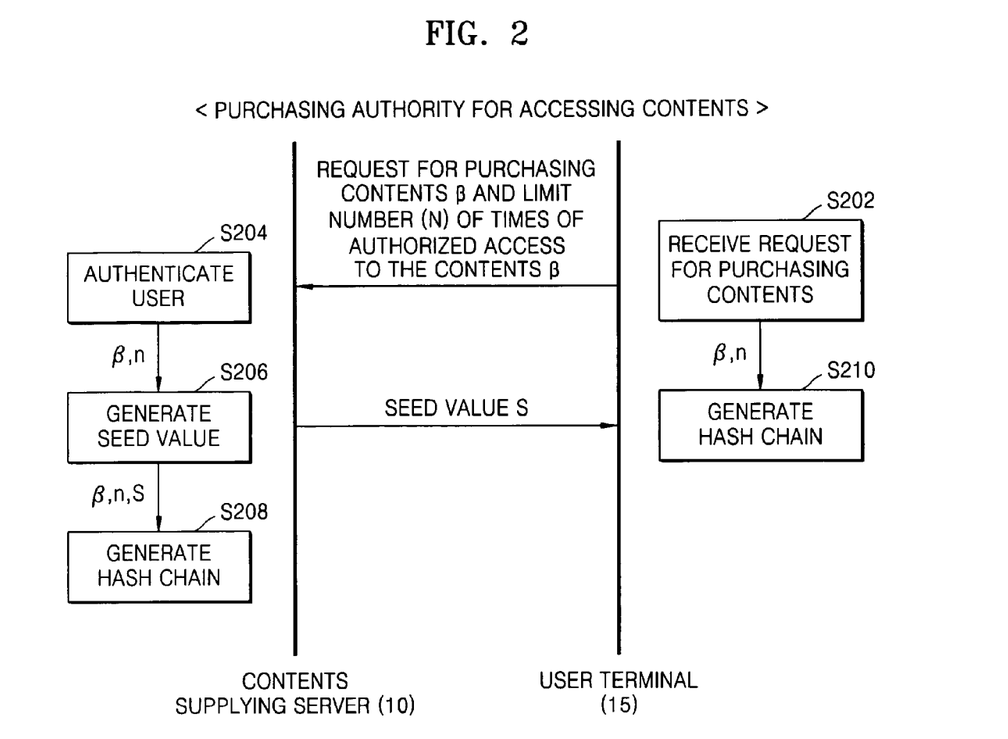
FIG. 2 illustrates a method of purchasing authority to access contents according to an exemplary embodiment of the present invention.

FIG. 2 illustrates a method according to an exemplary embodiment of the present invention in which a user purchases authority to access contents n times from the contents supplying server 10 using the user terminal 15, wherein n is a natural number.

The controller 153 of the user terminal 15 receives from a user a request for purchasing contents β and a number of times of authorized access to the contents P (hereinafter called a limit number) and transmits the request and the limit number to the contents supplying server 10 via the communicator 151 (Operation S202). The user authenticator 120 of the contents supplying server 10 authenticates the user using user information stored in the user information DB 110 and transmits the request for purchasing the contents β to the seed value generator 122 (Operation S204). The seed value generator 122 receives the request for purchasing the contents β and randomly generates a seed value S, based on which a hash chain composed of hash values for determining the limit number is generated. Then, the seed value generator 122 transmits the request, the limit number, and the seed value S to both the hash chain generator 124 and the user terminal 15 (Operation S206). The hash chain generator 124 generates a hash chain including n hash values based on the request for purchasing the contents β, the limit number, and the seed value S received from the seed value generator 122, and stores the hash chain in the hash chain DB 114 (Operation S208).

The hash chain generator 155 of the user terminal 15 also generates a hash chain including n hash values based on the seed value S received from the seed value generator 122 of the contents supplying server 10, the request for purchasing the contents β, and the limit number received from controller 153, and stores the hash chain in the hash chain DB 157. The hash chain generators 124 and 155 generate the hash chains using identical hash functions.

A hash function is used to receive a value of a certain size and output a value of a fixed size. Generally, the hash function is expressed as H(input value)=output value. The hash function should meet the conditions of weak collision freeness and one-wayness. A function H(x) has weak collision freeness when, given a, it is difficult to find b not equal to a such that H (b)=H (a). A hash function H(x) has one-wayness if, when given H(a), it is difficult to find a. The hash functions that meet theses conditions are a secure hash standard (SHS) hash function and a message digest (MD) 5 hash function. The hash chain is composed of a series of hash values derived from a seed value selected randomly and is given by the equation: Hash_Chain (n, Seed)=$\{(\omega_0, \omega_1, \ldots, \omega_{n-1}\}; \omega i = H (\omega i_{+1})$, where $\omega_{n-1}$=H(Seed), n is the limit number, and Seed=seed value.

Figure 3:
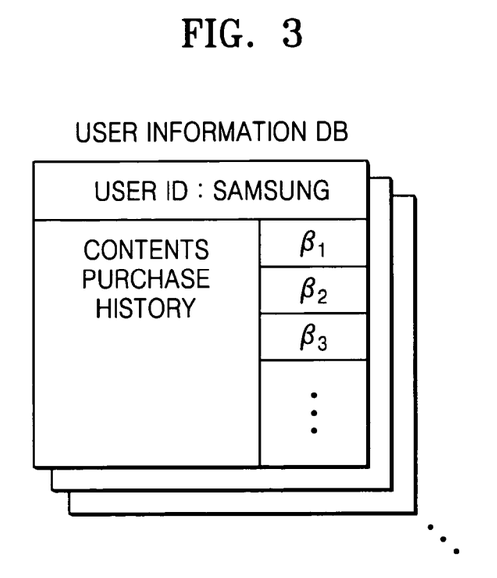
FIG. 3 illustrates a user information database of a contents supplying server of the system of FIG. 1 according to an exemplary embodiment of the present invention.
Figure 4:
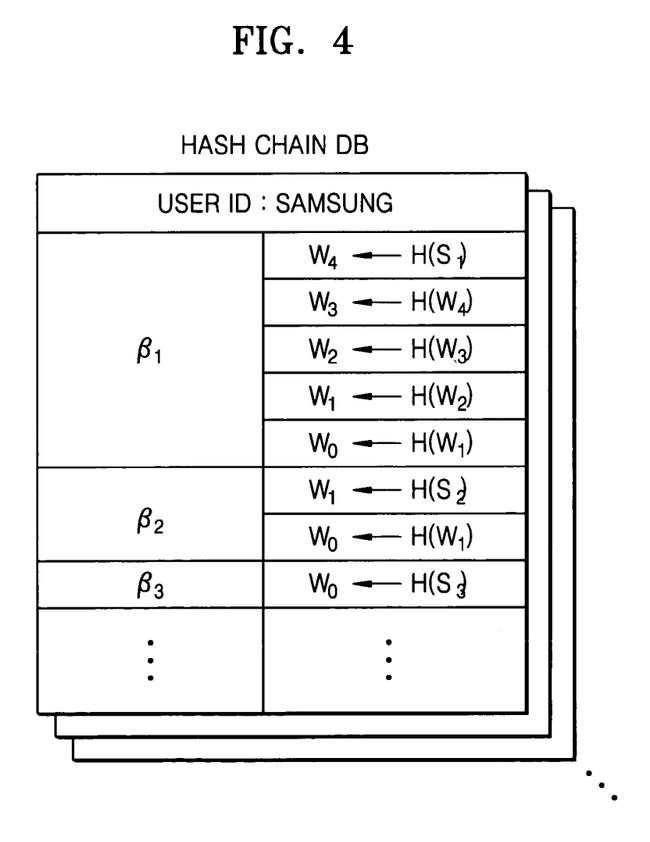
FIG. 4 illustrates a hash chain database of the contents supplying server of the system of FIG. 1 according to an exemplary embodiment of the present invention.

FIG. 3 illustrates the user information DB 110 of the contents supplying server 10 according to an exemplary embodiment of the present invention. FIG. 4 illustrates the hash chain DB 114 according to an exemplary embodiment of the present invention. Referring to FIGS. 3 and 4, the user information DB 110 includes a plurality of tables in which purchase histories are sorted according to user ID. The hash chain DB 114 includes a plurality of tables in which the hash values generated by the hash chain generator 124 based on a seed value generated by the seed value generator 122 are sorted according to contents that a user purchased. Referring to FIG. 3, a user, for example, Samsung, purchased authority to access first contents β1, second contents β2, and third contents β3. Referring to FIG. 4, the user, Samsung, is allocated to a hash chain including five, two, and one hash value derived from a first seed value S1, a second seed value S2, and a third seed value S3 with respect to the first contents β1, the second contents β2, and the third contents β3, respectively. Therefore, the user is authorized to access the first contents β1, the second contents β2, and the third contents β3 five times, twice, and once, respectively. The same user may access the first contents β1, the second contents β2, and the third contents β3 through different user terminals. Hence, in a user ID table of the user information DB 110, a contents purchase history and hash chain details may be sorted according to a user terminal that the user owns.

Figure 5:
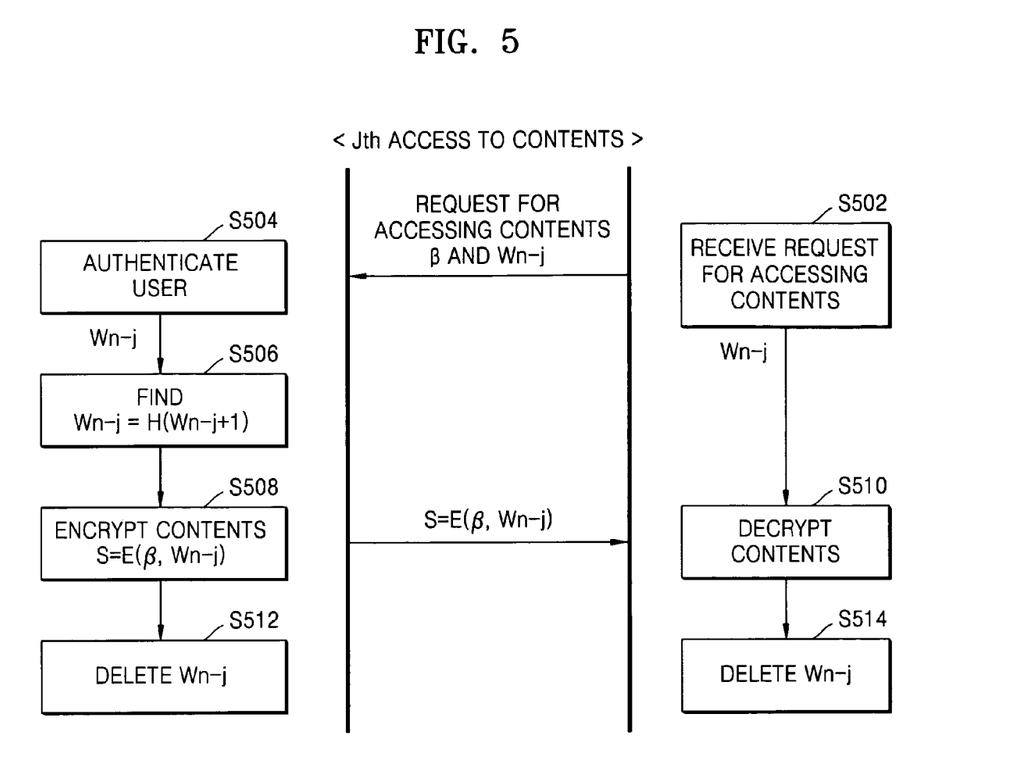
FIG. 5 illustrates a method of accessing the contents for a $j^{th}$ time according to an exemplary embodiment of the present invention.

FIG. 5 illustrates a method in which a user who has purchased the authority to access the contents β n times accesses the contents β using the user terminal 15 according to an exemplary embodiment of the present invention. Referring to FIG. 5, the controller 153 of the user terminal 15 transmits to the contents supplying server 10 a $j^{th}$ request for accessing the contents β and a hash value $\omega_{n-j}$ corresponding to the $j^{th}$ access to the contents β (Operation S502). Then, the user authenticator 120 of the contents supplying server 10 authenticates the user by determining whether the user has the authority to access the contents β based on the user information stored in the user information DB 110. When the user authenticator 120 determines that the user has the authority to access the contents β, the user authenticator 120 transmits the request for accessing the contents β and the hash value $\omega_{n-j}$ to the hash chain manager 126 (Operation S504).

When a hash value satisfying $\omega_{n-j}$=H($\omega n-j_{+1}$) is found in the hash chain DB 114, the hash chain manager 126 transmits the request for accessing the contents β and the hash value $\omega_{n-j}$ to the contents encrypter 128 (Operation S506). The contents encrypter 128 encrypts the contents β using the hash value $\omega_{n-j}$ and transmits encrypted contents 6 to the user terminal 15 via the communicator 130 (Operation 508). The user terminal 15 decrypts the encrypted contents δ received from the contents supplying server 10 using the hash value $\omega_{n-j}$ received from the hash chain DB 157, under the control of the controller 153 (Operation S510).

When the transmission and decryption of the encrypted contents δ are complete, the hash value $\omega_{n-j}$ is deleted from the hash chain DBs 114 and 157 (Operation S514). To easily determine how many times the contents β have been accessed, the hash chain manager 126 and the controller 153 may control each of the hash chain DBs 114 and 157 using a pointer such that the hash values stored in the hash chain DBs 114 and 157 can be sequentially selected, first from those that were directly derived from the seed values. Therefore, as soon as the hash value $\omega_{n-j}$ is deleted from the hash chain DBs 114 and 157, the pointer points to a next hash value $\omega_{n-j-1}$.

Figure 6:
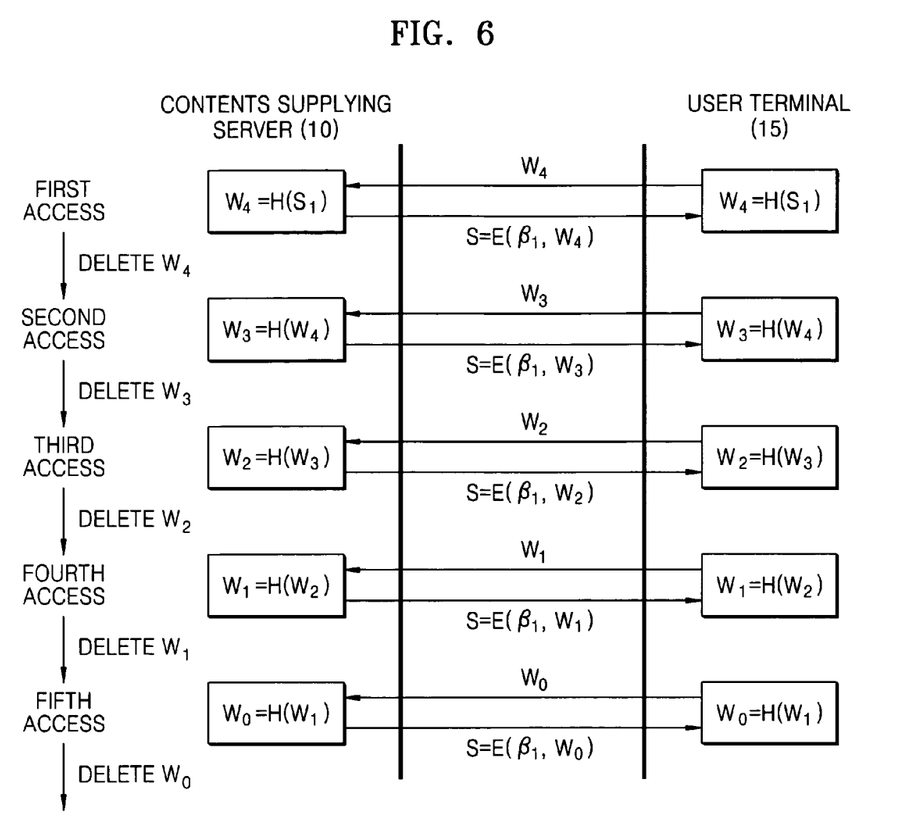
FIG. 6 illustrates a method of limiting the number of times of access to the contents according to an exemplary embodiment of the present invention.

FIG. 6 illustrates a method of limiting the number of times the first contents $\beta_1$ are accessed by a user, for example, Samsung, having the authority to access the first contents $\beta_1$ five times. When the user terminal 15 accesses the first contents $\beta_1$ for the first time, the user terminal 15 transmits a fourth hash value $\omega_4$ to the contents supplying server 10. The contents supplying server 10 encrypts the first contents $\beta_1$ using the fourth hash value $\omega_4$ stored in the hash chain DB 114 and transmits the fourth hash value $\omega_4$ to the user terminal 15. When the fourth hash value $\omega_4$ has been transmitted to the user terminal 15, the contents supplying server 10 deletes the fourth hash value $\omega_4$ from the hash chain DB 114 and points the pointer to a third hash value $\omega_3$. The user terminal 15 also deletes the fourth hash value $\omega_4$ from the hash chain DB 157 and points its pointer to the third hash value $\omega_3$.

When the user terminal 15 accesses the first contents $\beta_1$ for the second time, it transmits the third hash value $\omega_3$ to the contents supplying server 10. Then, the contents supplying server 10 determines whether its third hash value $\omega_3$, at which its pointer is presently pointing, matches the third hash value $\omega_3$ received from the user terminal 15. If they match, the contents supplying server 10 encrypts the first contents $\beta_1$ using the third hash value $\omega_3$ and transmits the third hash value $\omega_3$ to the user terminal 15. When the third hash value $\omega_3$ has been transmitted to the user terminal 15, the contents supplying server 10 deletes the third hash value $\omega_3$ from the hash chain DB 114 and points its pointer to a next hash value. The user terminal 15 also deletes the third hash value $\omega_3$ from the hash chain DB 157 and points its pointer to the next hash value.

For example, if the fourth hash value $\omega_4$ is transmitted to the contents supplying server 10 when it is the second time that the user terminal 15 is accessing the first contents $\beta_1$, the contents supplying server 10 does not allow the user terminal 15 to access the first contents $\beta_1$ because the fourth hash value $\omega_4$ is not present therein.

After the user terminal 15 accesses the first contents $\beta_1$ up to five times by repeating this process, it is no longer allowed to access the first contents $\beta_1$ since all the hash values allocated to the first content $\beta_1$ for the user terminal 15 have already been deleted.

As described above, the contents supplying server 10 generate seed values. However, the system according to an embodiment of the present invention may be configured such that the user's terminal 15 generates the seed values, and the contents supplying server 10 receives the seed values.

In addition, the hash chain DBs 114 and 157 may be configured such that hash values of a hash chain are deleted randomly rather than sequentially as illustrated in FIG. 6. In this case, when accessing contents, the user terminal 15 randomly extracts a hash value from the hash chain DB 157 and transmits the hash value to the contents supplying server 10. The contents supplying server 10 encrypts the contents using the hash value and transmits encrypted contents to the user terminal 15. Then, the user terminal 15 decrypts the encrypted contents. When the transmission and decryption of the encrypted contents are complete, the hash value is deleted from the hash chain DBs 114 and 157.

Instead of extracting hash values randomly, a method of attaching an index to each of the hash values arranged randomly may be considered to determine which hash value corresponds to which number of times the contents have been accessed.

As described above, embodiments of the present invention may be used to limit a number of times contents are accessed simply and securely using the one-wayness of a hash function and a hash chain composed of hash values corresponding to a limit number.

The present invention further provides a method of transmitting contents securely. In this method, whenever a user accesses a system, the contents are encrypted using a hash value, and encrypted contents are transmitted to the user.

In addition, in the present invention, a contents supplier, not a user terminal, manages information regarding access authority of the contents, thus preventing illegal distribution of the contents by the ill-intended manipulation or hacking by the user.

The present invention relates to a contents supplying server, a method of limiting a number of times contents can be accessed by a user terminal, and a recording medium on which a program executing the method is recorded. The recording medium may be a magnetic or optical recording medium or a medium for carrier-wave transmission over a network such as the Internet.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. An apparatus limiting a number of times contents are accessed by a user terminal, the apparatus comprising:
    a hash chain generator which receives information indicating selected contents by the user terminal and information indicating a number of times n the user terminal has an authority to access the selected contents and generates a first hash chain comprising a string of n hash values derived from a seed value; and
    a contents access manager which deletes the hash values one by one from the first hash chain when the user terminal accesses the selected contents, wherein the number of times n the user terminal has the authority to access the selected contents and the number of the hash values in the string is decreased by a number of deleted hash values,
    wherein the hash chain generator generates the seed value randomly and transmits the generated seed value to the user terminal such that the user terminal can generate a second hash chain identical to the first hash chain generated by the hash chain generator based on the seed value.

2. The apparatus of claim 1, wherein the contents access manager encrypts the selected contents using one of the hash values of the first hash chain and transmits encrypted contents to the user terminal, thereby allowing the user terminal to access the contents, and the hash value used for encryption is deleted from the first hash chain.

3. The apparatus of claim 2, wherein the contents access manager encrypts the selected contents using a hash value corresponding to a total number of times that the contents have been accessed, transmits the encrypted contents to the user terminal when the hash value corresponding to the total number of times that the selected contents have been accessed is received from the user terminal, and points a pointer of the first hash chain to a hash value corresponding to a next number of times the selected contents have been accessed.

4. A method of limiting a number of times contents are accessed by a contents requester having an authority to access the contents n times, the method comprising:
- preparing a hash chain with respect to the contents, the hash chain comprising a string of n hash values derived from a seed value;
- storing the hash chain in a hash chain database; and
- deleting the hash values one by one from the stored hash chain when the contents requester accesses the contents, wherein a total number of hash values deleted equals a number of times that the contents have been accessed by the contents requester and wherein a number of the hash values in the string is decreased by the total number of the deleted hash values,
- wherein the deleting the hash value from the stored hash chain comprises:
- encrypting the contents using one of the hash values of the stored hash chain and transmitting encrypted contents to the contents requester, thereby allowing the contents requester to access the contents, and
- deleting the hash value used for encryption from the stored hash chain.

5. The method of claim 4, wherein the encrypting the contents using one of the hash values of the hash chain and transmitting the encrypted contents to the contents requester comprises:
- encrypting the contents using a hash value corresponding to the total number of times that the contents have been accessed and transmitting the encrypted contents to the contents requester when receiving the hash value corresponding to the total number of times that the contents have been accessed from the contents requester; and
- pointing a pointer of the hash chain to a hash value corresponding to a next number of times that the contents have been accessed.

6. A non-transitory computer readable recording medium comprising a program which, when executed by a computer, causes the computer to perform a method of limiting a number of times contents are accessed by a contents requester having authority to access the contents n times, the method comprising:
- preparing a hash chain with respect to the contents, the hash chain comprising a string of n hash values derived from a seed value; and
- deleting the hash values from the hash chain when the contents requester accesses the contents, wherein a total number of hash values deleted equals the number of times that the contents have been accessed by the contents requester and wherein a number of the hash values in the string is decreased by the total number of the deleted hash values,
- wherein the deleting the hash value from the hash chain comprises:
- encrypting the contents using one of the hash values of the hash chain and transmitting encrypted contents to the contents requester, thereby allowing the contents requester to access the contents, and
- deleting the hash value used for encryption from the hash chain.

7. The non-transitory computer readable recording medium of claim 6, wherein the encrypting the contents using one of the hash values of the hash chain and transmitting the encrypted contents to the contents requester comprises:
- encrypting the contents using a hash value corresponding to the total number of times that the contents have been accessed and transmitting the encrypted contents to the contents requester when receiving the hash value corresponding to the total number of times that the contents have been accessed from the contents requester; and
- pointing a pointer of the hash chain to a hash value corresponding to a next number of times that the contents have been accessed.

8. An apparatus having authority to access contents n times, the apparatus comprising:
- a hash chain generator which generates a hash chain comprising n hash values derived from a seed value;
- a hash chain manager which transmits to a contents supplier a hash value corresponding to a total number of times that the contents have been accessed; and
- a contents decrypter which decrypts encrypted contents received from the contents supplier using the hash value corresponding to the total number of times that the contents have been accessed.

9. The apparatus of claim 8, wherein the hash chain manager deletes the hash value corresponding to the total number of times that the contents have been accessed from the hash chain.

10. The apparatus of claim 8, wherein the seed value is received from the contents supplier.

11. A non-transitory computer readable recording medium comprising a program which, when executed by a computer, causes the computer to perform a method of limiting a number of times contents are accessed by a contents requester having authority to access the contents n times is recorded, the method comprising:
- generating a first hash chain comprising n hash values derived from a seed value;
- transmitting to the contents supplying server a hash value corresponding to a total number of times that the contents have been accessed;
- receiving encrypted contents using the hash value corresponding to the total number of times that the contents have been accessed from the contents supplying server; and
- decrypting the encrypted contents encrypted using the hash value corresponding to the total number of times that the contents have been accessed.

12. The non-transitory computer readable recording medium of claim 11, wherein the generating the first hash chain comprising n hash values derived from a seed value comprises generating the seed value randomly and transmitting the generated seed value to the contents supplying server such that the contents supplying server can generate a second hash chain identical to the first hash chain generated by the hash chain generator based on the seed value.

13. The non-transitory computer readable recording medium of claim 11, wherein the seed value is received from the contents supplying server.

14. The non-transitory computer readable recording medium of claim 11, wherein the method further comprises:
- deleting the hash value corresponding to the total number of times that the contents have been accessed from the first hash chain after completing the decrypting the encrypted contents; and
- pointing a pointer of the first hash chain to a hash value corresponding to a next number of times that the contents have been accessed.

* * * * *